United States Patent [19]

Liao

[11] Patent Number: 5,705,737

[45] Date of Patent: Jan. 6, 1998

[54] PRESSURE LEAKAGE DETECTOR

[76] Inventor: Wen-Chin Liao, No. 30, Alley 1, Lane 59, Chungshan Road, Fengyuan, Taichung, Taiwan

[21] Appl. No.: 805,904

[22] Filed: Mar. 4, 1997

[51] Int. Cl.$^6$ .................................................... G01M 3/04
[52] U.S. Cl. .................................................. 73/49.7; 73/40
[58] Field of Search .................... 73/49.7, 45.8, 73/756, 49.2, 49.3, 40, 40.5 R

[56] References Cited

U.S. PATENT DOCUMENTS

| | | | |
|---|---|---|---|
| 3,577,768 | 5/1971 | Aprill et al. | 73/40.5 R |
| 3,975,944 | 8/1976 | Aprill | 73/37 X |
| 4,350,038 | 9/1982 | Soncrant | 73/49.2 |
| 4,993,256 | 2/1991 | Fukuda | 73/49.2 |

*Primary Examiner*—Hezron E. Williams
*Assistant Examiner*—Jay L. Politzer

*Attorney, Agent, or Firm*—Bacon & Thomas

[57] ABSTRACT

A pressure leakage detector includes a primary gage and a secondary gage selectively connected to each other by means of a valve. The primary gage is connected to an air compressor via a pressure regulator for regulating the pressure supplied thereto and has an outlet port adapted to directly continuously supply the pressure to a large container to detect the leakage of container by means of visual inspection. The secondary gage has an outlet port adapted to connect to a closed system on which a leakage detection is to be carried out. By opening the valve between the two gages to have the closed system reaches a predetermined internal pressured set by the regulator and then closing the valve, a leakage of the closed system may be found by a drop of the pressure reading of the secondary gage. Thereafter, a visual inspection will indicate the exact location of leakage. Thus a precise and correct detection on either a small volume closed system or a large container may be preformed in an quite easy manner.

2 Claims, 9 Drawing Sheets

PRESSURE LEAKAGE DETECTOR

FIELD OF THE INVENTION

The present invention relates to a leakage detector and in particular to a leakage detector using pressure drop to detect leakage.

BACKGROUND OF THE INVENTION

In an automobile, there are several sealed or closed systems, such as engine cooling system, including the radiator, which in a normal operation should be sealingly closed so as to maintain the internal pressure to prevent the coolant flowing through the system from being vaporized. Any serious leakage in the system will result in vaporization of the coolant which in turn reduces the amount of heat that the coolant can carry away from the engine, causing significant temperature rise in the engine and eventually damaging the engine. One of the ways to detect the leakage of the engine cooling system is to pressurize the coolant inside the system by pressurized air to a predetermined level and monitor the internal pressure of the system. If a pressure drop occurs, then there is a leakage on the system.

Figure 1:
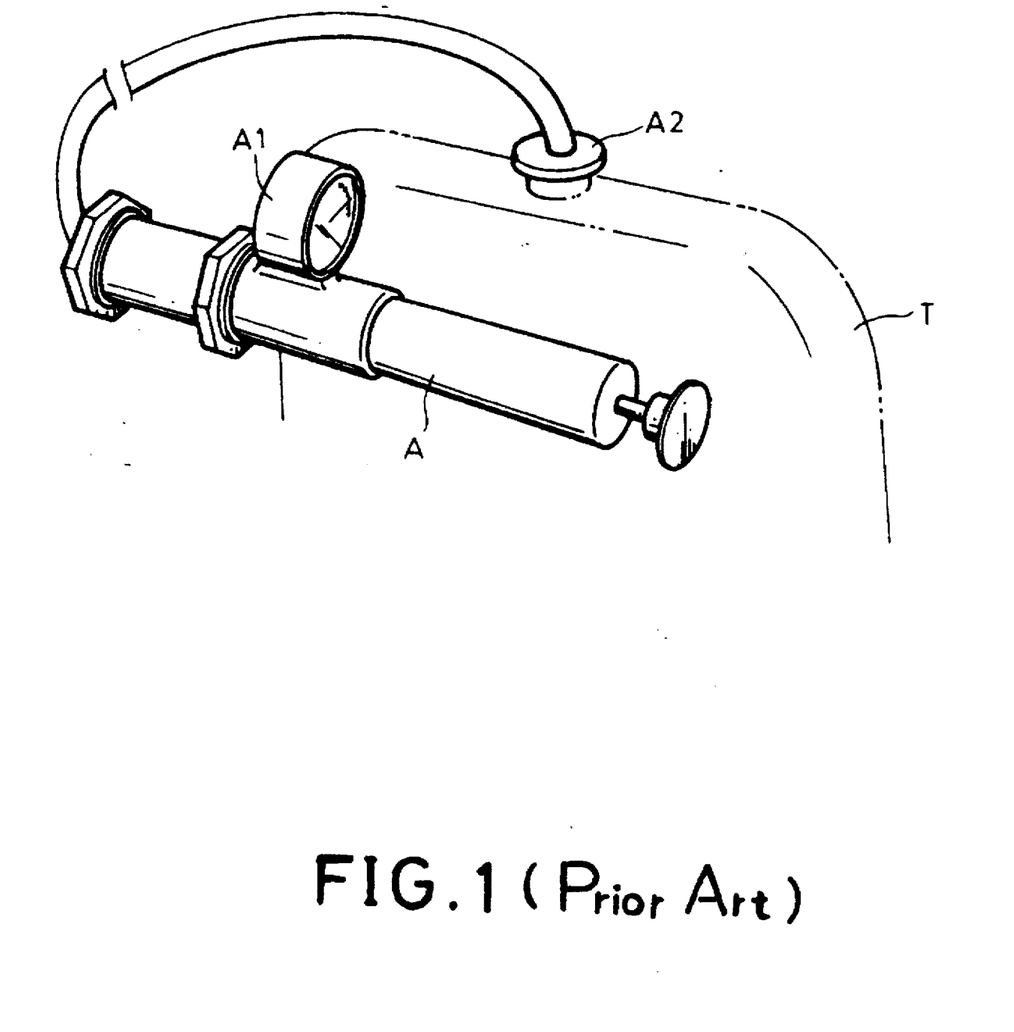
FIG. 1 is a perspective view showing a conventional leakage detector.

A conventional device to preform such a leakage detection is shown in FIG. 1 of the attached drawings, comprising a manually operated air pump A having a pressures gage A1 mounted thereon. The air pump A has an outlet tube with an adaptor A2 fixed thereon to connect to a filler opening of an automobile radiator T. By manually operating the air pump A to pump air into the radiator T and pressurize the coolant inside the radiator T to a predetermined level which is read by the pressure gage A1, one may know if there is any leakage on the radiator T by monitoring the reading of the pressure gage A1. If a significant pressure drop is known from the gage A1, then there is leakage on the radiator T.

This conventional way although effective in determining if there is leakage of the radiator T itself, yet is not capable to detect any leakage occurring on peripheral parts of the radiator T, such as the filler cap T1 of the radiator T and the secondary coolant reservoir, including the cap T2, piping T4 and hose T3 connecting to the radiator T. Any leakage on these peripheral parts similarly causes serious damage to the engine.

It is therefore desirable to provide a pressure leakage detector which allows a user to conduct a more complete detection of the leakage of any sealingly closed system or container by suitably pressurizing the system.

SUMMARY OF THE INVENTION

Therefore, the principal object of the present invention is to provide a pressure leakage detector which overcomes the drawbacks of the prior art pressure leakage detecting device.

Another object of the present invention is to provide a pressure leakage detector which supplies pressurized air from a source to a closed system on which the leakage detection is to be preformed and then cut off the pressure supply so that by monitoring the internal pressure change of the closed system, any leakage on the closed system may be detected.

Another object of the present invention is to provide a pressure leakage detector which continuously supplies pressurized air from a source to a large sealed container so that any leakage on the large container may be detected by visual inspection.

In accordance with the present invention, there is provided a pressure leakage detector comprising a primary four way connector having a first, second, third and fourth ports and a second primary four way connector having a first, second, third and fourth ports. A first pressure gage is mounted to the first port of the primary connector and a second pressure gage is mounted to the first port of the secondary connector. A valve is connected between the second ports of the primary and secondary connectors to provide a controllable fluid communication therebetween. A pressure regulator is connected to the third port of the primary connector and having an inlet port adapted to connect to a pressurized air source, such as an air compressor. A manually operated pressure relief valve is mounted to the third port. A valve for directly providing the pressurized air to an object to be detected is provided on the fourth port of the primary connector. A valve for providing the pressurized air from the secondary connector so an object to be detected is provided on the fourth port of the secondary connector.

BRIEF DESCRIPTION OF THE DRAWINGS

The present invention will be better understood from the following description of a preferred embodiment thereof with reference to the attached drawings, wherein.

DETAILED DESCRIPTION OF THE PREFERRED EMBODIMENTS

Figure 2:
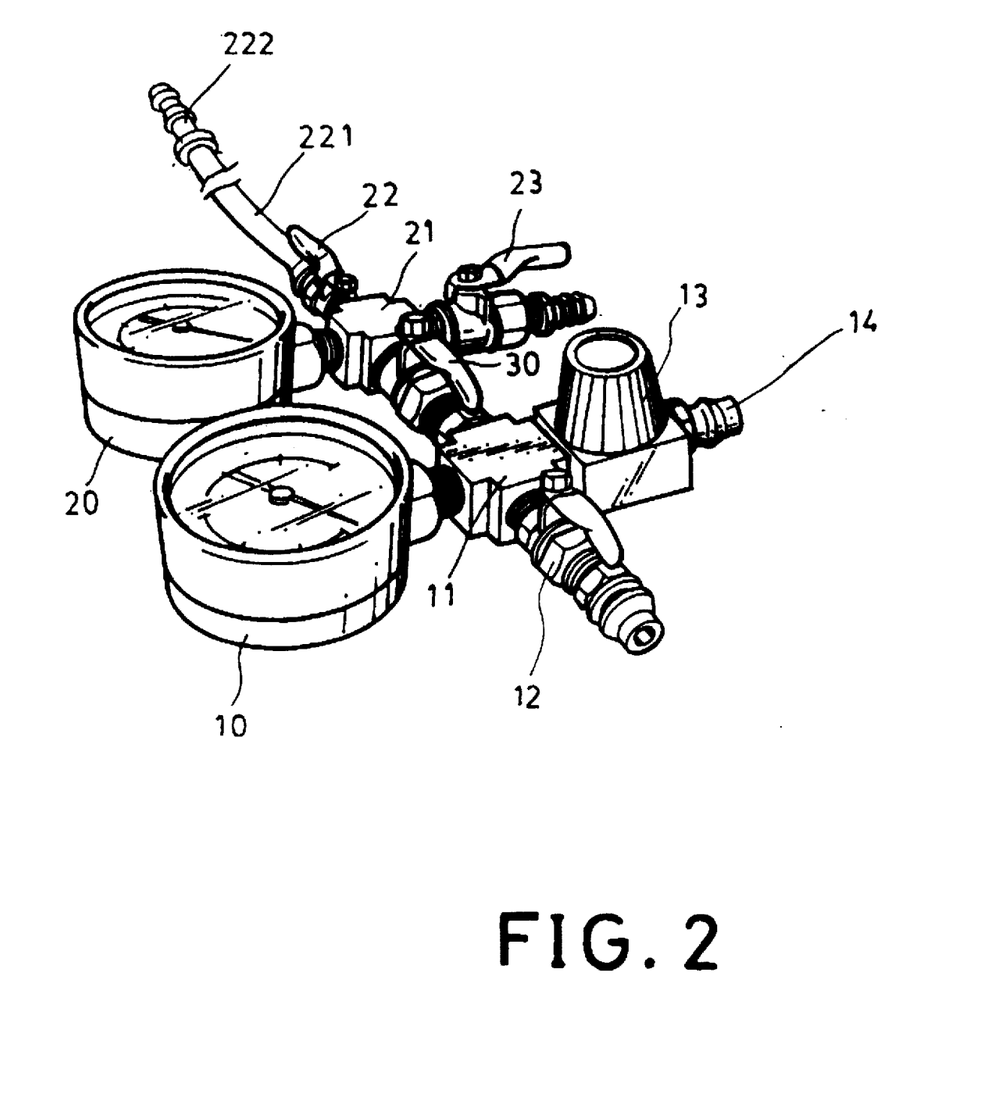
FIG. 2 is a perspective view showing a pressure leakage detector constructed in accordance with a preferred embodiment of the present invention.

With reference to the drawings and in particular to FIG. 2, wherein a pressure leakage detector constructed in accordance with a preferred embodiment of the present invention is shown, the pressure leakage detector of the present invention is particularly suitable in detecting the leakages occurring on closed systems of an automobile, such as fuel supply system, engine cooling system, oil reservoir. As shown in FIG. 2, the pressure leakage detector of the present invention comprises a primary pressure gage 10 which is connected to a pressure source, such as an air compressor P, and a secondary pressure gage 20 which is connected to the primary pressure gage 10 by means of a valve 30. The secondary pressure gage 20 is adapted to connect to a closed system or a sealed container On which leakage detection is to be performed.

Both the primary and secondary pressure gages 10 and 20 are provided with a four way connector 11 or 21 each having four ports of which a first port is connected to the primary and secondary pressure gages 10 and 20 and a second port is connected to each other by the valve 30. A third port of the primary four way connector 11 has a pressure regulator 13 mounted thereon with an inlet port 14 of the pressure regulator 13 connected to the air compressor P by means of suitable piping or tube. The pressure regulator 13 provides a manual control to the pressure flowing into the primary pressure gage 10. A fourth port of the primary four way connector 11 is provided with a valve 12 for directly and continuously supplying pressurized air to a system or container to be detected.

A third port of the secondary four way connector 21 is also provided with a valve 23 for the purpose of manually operated pressure relief. A fourth port of the secondary four way connector 23 is connected a hose 221 via a valve 22. An adaptor 222 is provided on the remote end of the hose 221 adapted to connect to for example a piping T4 of the secondary coolant reservoir cap T2 which is in turn connected to the radiator T1 via a hose T3, as shown in FIG. 3A.

With such an arrangement shown in FIG. 3A, a leakage detection may be performed on the engine cooling system and the operation of the leakage detection on the engine cooling system will be described as an example of the application of the present invention. However, it should be understood that the present invention may also be used in detecting the leakage of other closed system, such as fuel supply system.

Figure 3A:
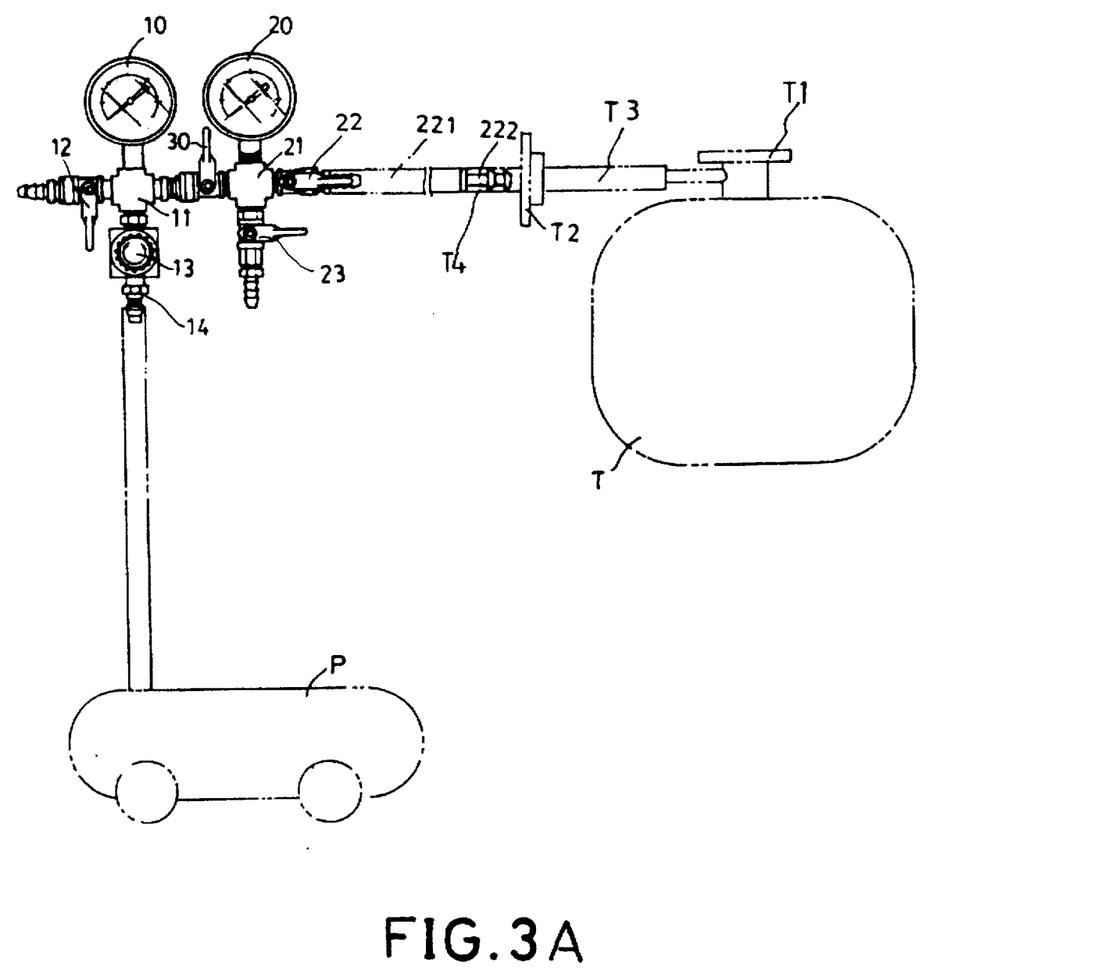
FIGS. 3A–3F is shows an example of the operation of the pressure leakage detector of the present invention.
Figure 3B:
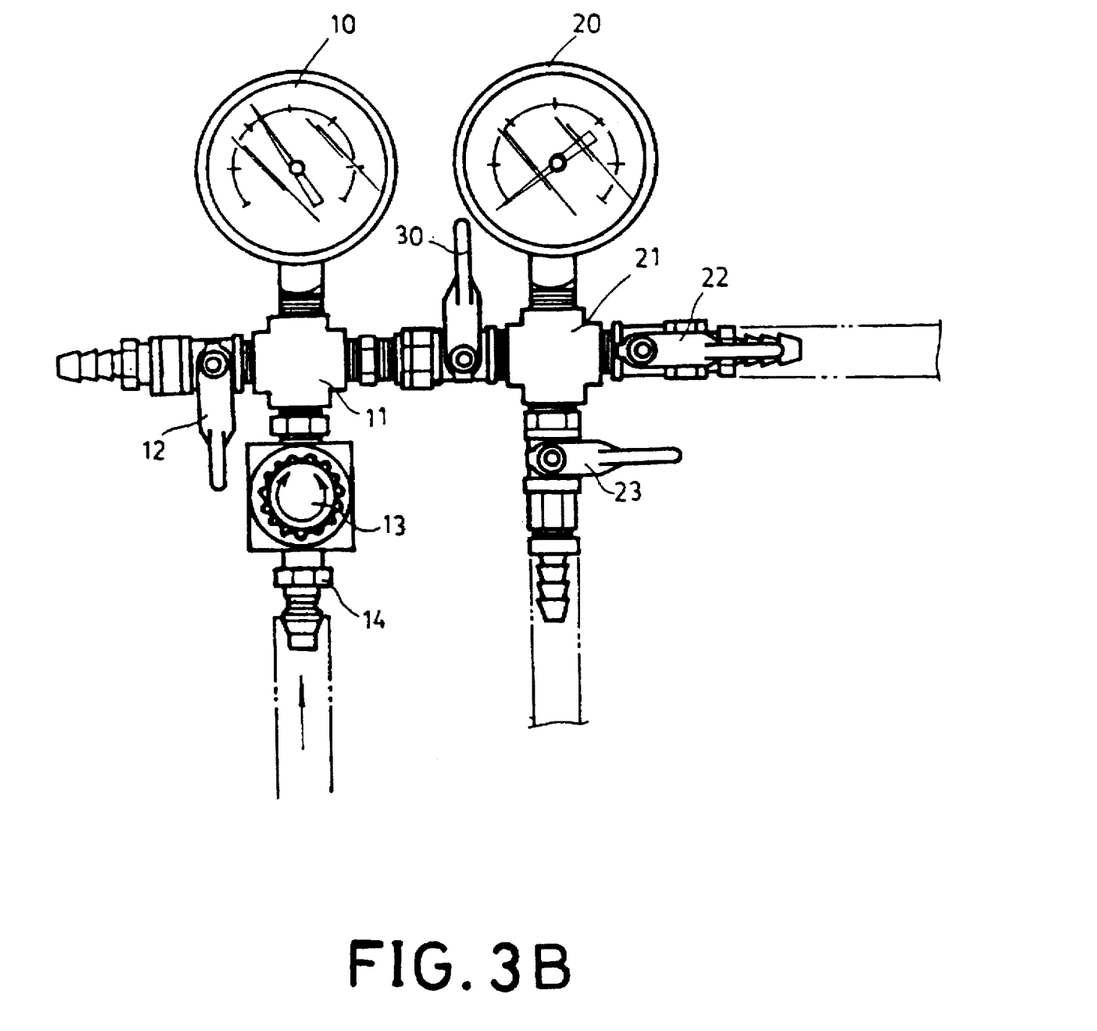
Figure 3C:
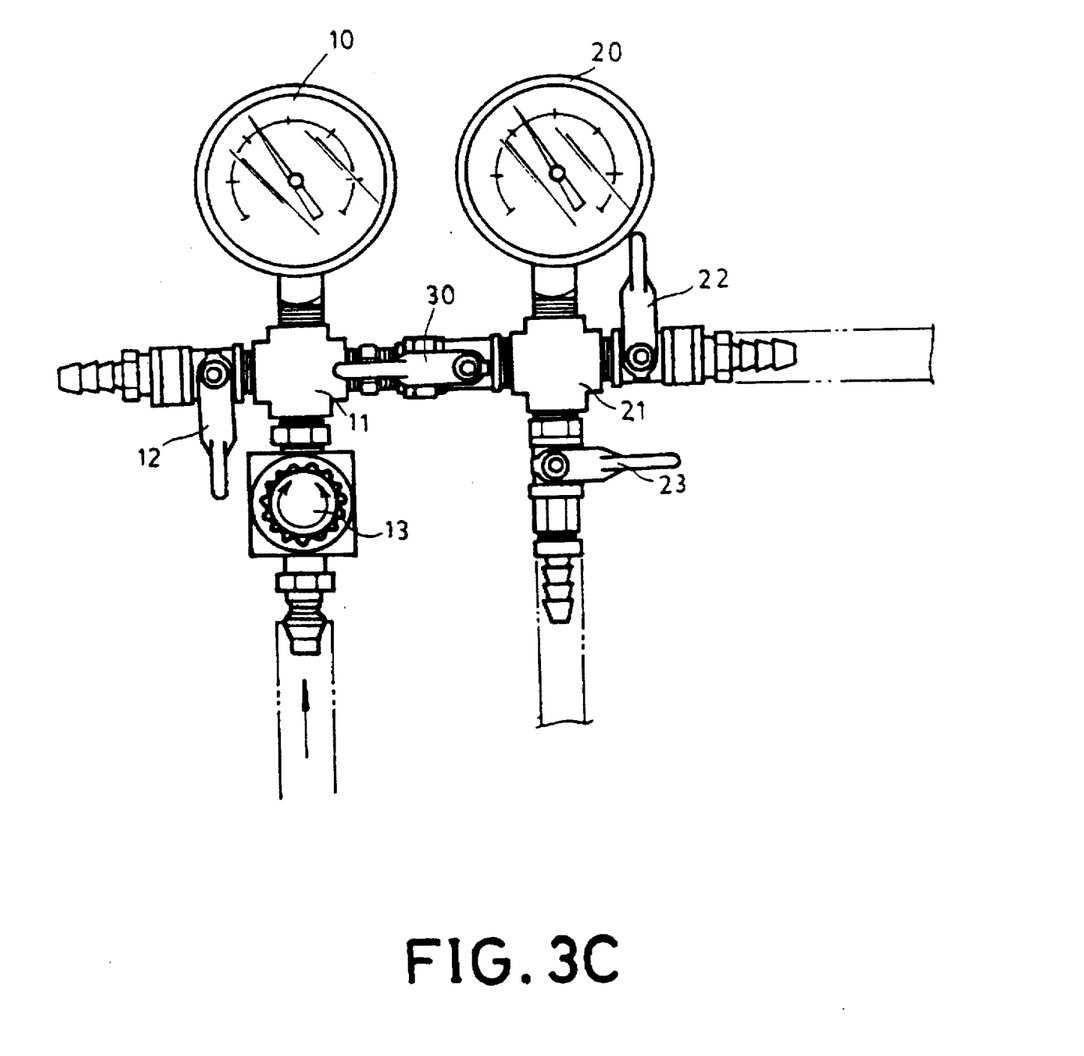

With reference to FIG. 3A first, as described above, in using the leakage detector of the present invention to detect the leakage of the engine cooling system, the operator connects the adaptor 222 to the piping T4 of the second coolant reservoir cap T2 and connecting the inlet port 14 of the pressure regulator 13 to an air compressor P. The valve 30 between the primary and secondary gages 10 and 20 is initially closed. Starting the compressor P and adjusting the pressure regulator 13, the pressure inside the primary pressure gage 10 is increased to a desired level set by the pressure regulator 13, see FIG. 3B, with the reading of the primary pressure gage 10 indicating the pressure. By closing the valve 22 and opening the valve 30, as shown in FIG. 3C, the pressure is allowed to enter the secondary pressure gage 20 and is limited within the secondary pressure gage 20, until the reading of the primary pressure gage 10 is substantially the same as that of the secondary pressure gage 20. It should be noted that the valve 23 for manual pressure relief is always closed unless a pressure relief operation is to be carried out. Also in this case, the fourth port of the primary four way connector 11 is closed.

Figure 3D:
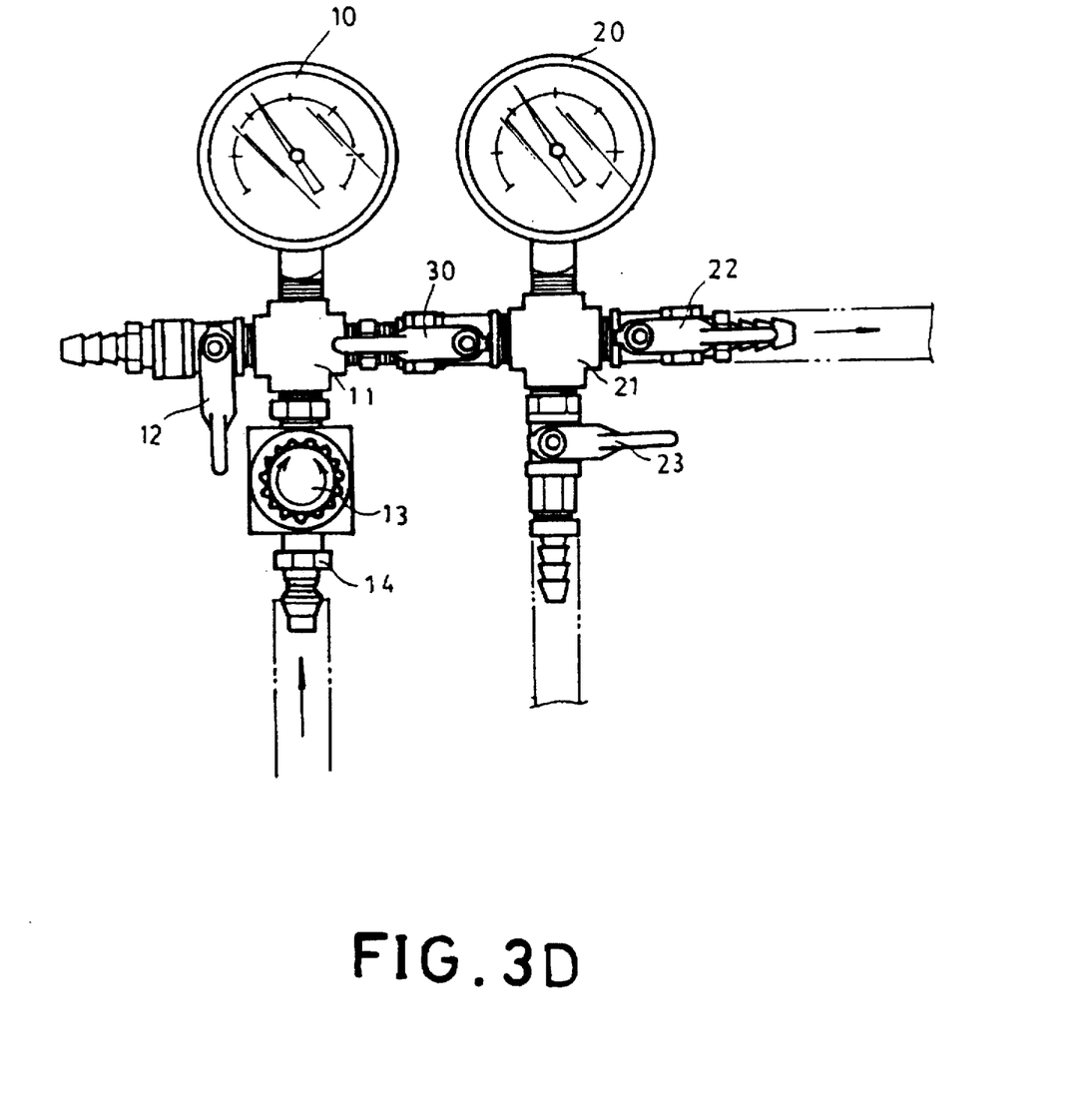

Now, by opening valve 22, the pressurized air is conducted into the engine cooling system via the adaptor 222, see FIG. 3D. By doing so, the reading of the secondary gage 20 will temporally change but soon return to its original position which is substantially the same as the reading of the primary pressure gage 10. Once the reading of the secondary pressure gage 20 restores its original level, the valve 30 is closed to cut off the pressurized air supplied via the primary four way connector 11, see FIG. 3E, and monitor the reading of the secondary pressure gage 20. A drop of the reading of the secondary pressure gage 20 indicates a leakage on the system that is detected and then a visual inspection with/ without bubble detection method may be conducted to determine the exact location of leakage.

Figure 3E:
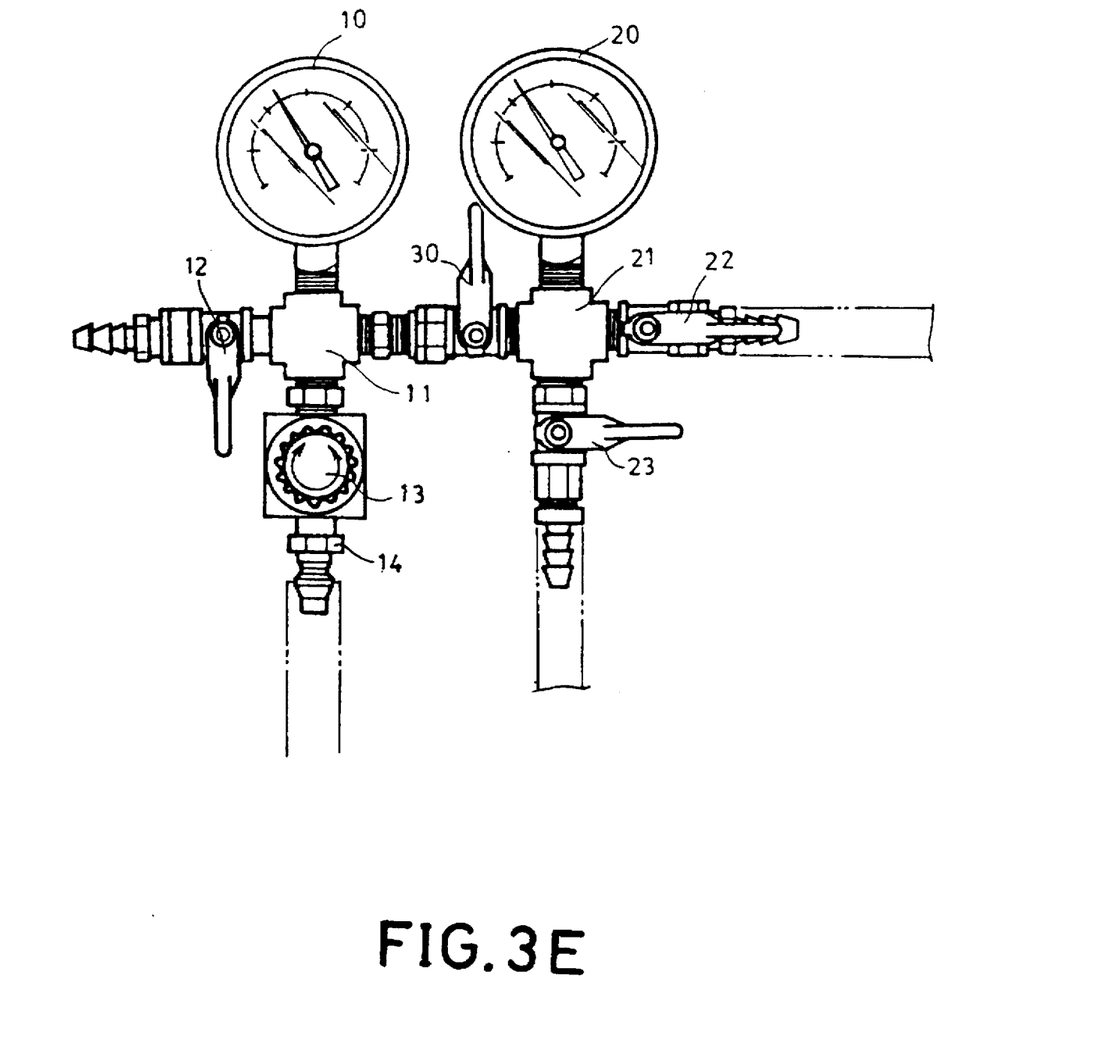

No pressure drop indicates that the system has no leakage.

Figure 3F:
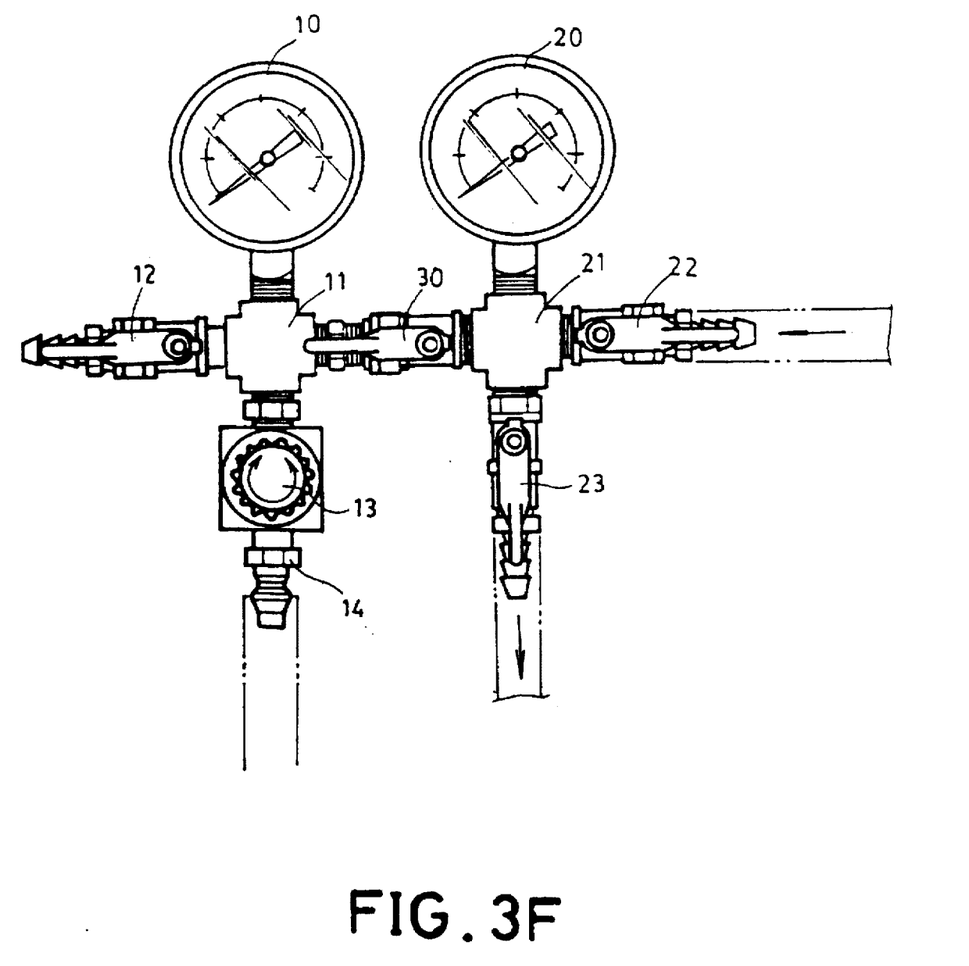

Once the detection is completed, the operator may relieve the pressure inside the engine cooling system by opening the valve 23, as shown in FIG. 3F.

Figure 4:
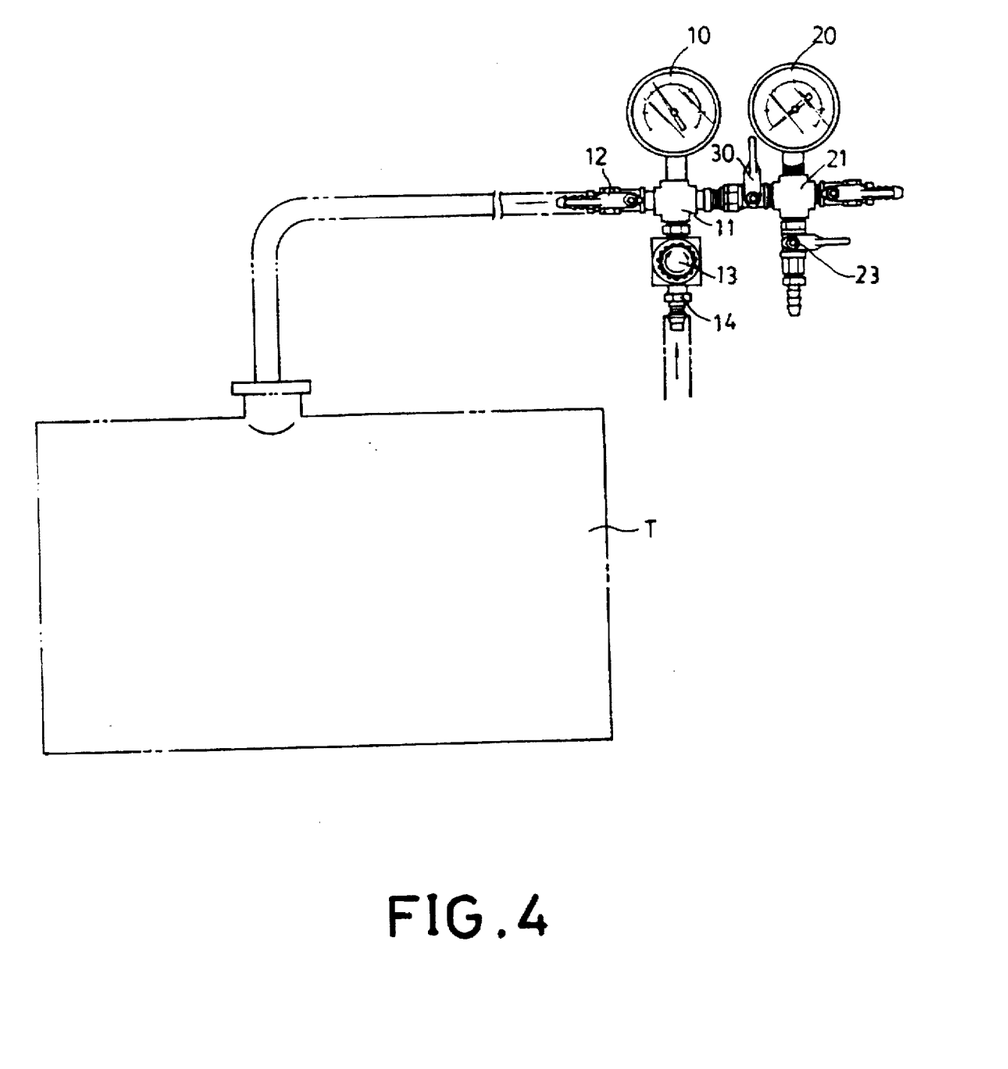
FIG. 4 shows the application of the leakage detector of the present invention in detecting the leakage of a large sealed container

As mentioned above, the pressure leakage detector of the present invention may also have other applications, for example to detect the leakage of a fuel tank, as shown in FIG. 4. In such an application, the pressurized air from the air compressor (not shown in FIG. 4) via the primary four way connector 11 is directly supplied to the fuel tank T via the fourth port of the primary four way connector 11 by opening the valve 12. The valve 30 between the primary and secondary pressure gages 10 and 20 is closed. The pressure supplied to the fuel tank T is set to a desired level by means of the pressure regulator 13. In this situation, the pressurized air is continuously supplied to the fuel tank T and a visual inspection with/without bubble detection method may then be carried out to determined the exact location of leakage. This way is particularly suitable for detecting leakage on large containers.

It is apparent that although the present invention is illustrated with the description of the preferred embodiment, it is contemplated that there may be changes and modifications in the described embodiment that can be carried out without departing from the scope of the invention which is intended to be limited only by the appended claims.

What is claimed is:

1. A pressure leakage detector comprising a primary four way connector having a first, second, third and fourth ports and a second primary four way connector having a first, second, third and fourth ports, a primary pressure gage being mounted to the first port of the primary four way connector and a secondary pressure gage being mounted to the first port of the secondary four way connector, a valve being connected between the second ports of the primary and secondary four way connectors; a pressure regulator being connected to the third port of the primary four way connector and having an inlet port adapted to connect to a pressurized air source, a manually operated pressure relief valve being mounted to the third port of the secondary four way connector, a valve for directly providing the pressurized air to an object to be detected being provided on the fourth port of the primary four way connector, a valve for providing the pressurized air from the secondary four way connector to an object to be detected being provided on the fourth port of the secondary four way connector.

2. The pressure leakage detector as claimed in claim 1, wherein the pressurized air source comprises an air compressor.

* * * * *